US012601583B2

(12) United States Patent
Chen et al.

(10) Patent No.: US 12,601,583 B2
(45) Date of Patent: Apr. 14, 2026

(54) MULTI-CHANNEL SELF-MIXING INTERFEROMETRIC SENSOR

(71) Applicant: Apple Inc., Cupertino, CA (US)

(72) Inventors: Tong Chen, Fremont, CA (US); Yongkang Gao, Sunnyvale, CA (US); Xiao Xiang, San Jose, CA (US); David D. Dashevsky, San Jose, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 18/664,987

(22) Filed: May 15, 2024

(65) Prior Publication Data

US 2024/0384980 A1      Nov. 21, 2024

Related U.S. Application Data

(60) Provisional application No. 63/467,207, filed on May 17, 2023.

(51) Int. Cl.
*G01B 9/02* (2022.01)
*G01B 9/02001* (2022.01)

(52) U.S. Cl.
CPC ..... *G01B 9/02092* (2013.01); *G01B 9/02007* (2013.01); *G01B 2290/45* (2013.01); *G01B 2290/70* (2013.01)

(58) Field of Classification Search
CPC ............ G01B 9/02092; G01B 9/02007; G01B 2290/45; G01B 2290/70
See application file for complete search history.

(56) References Cited

U.S. PATENT DOCUMENTS

| | | | |
|---|---|---|---|
| 5,539,562 | A | 7/1996 | Morioka |
| 5,974,071 | A | 10/1999 | Jiang et al. |
| 5,978,401 | A | 11/1999 | Morgan |
| 6,055,262 | A | 4/2000 | Cox et al. |
| 6,253,097 | B1 | 6/2001 | Aronow et al. |
| 6,272,269 | B1 | 8/2001 | Naum |
| 6,310,707 | B1 | 10/2001 | Kawase et al. |
| 6,348,684 | B1 | 2/2002 | Nykolak et al. |
| 6,459,835 | B1 | 10/2002 | Nagaoka et al. |
| 6,574,398 | B2 | 6/2003 | Coldren et al. |
| 6,592,245 | B1 | 7/2003 | Tribelsky et al. |

(Continued)

FOREIGN PATENT DOCUMENTS

| | | |
|---|---|---|
| CN | 2738434 | 11/2005 |
| CN | 101592605 | 12/2009 |

(Continued)

OTHER PUBLICATIONS

Huang et al., "A nanoelectromechanical tunable laser," *nature photonics*, vol. 2, Mar. 2008, pp. 180-184.

(Continued)

*Primary Examiner* — Jonathan M Hansen
(74) *Attorney, Agent, or Firm* — Brownstein Hyatt Farber Schreck, LLP

(57) ABSTRACT

A multi-channel SMI sensor includes an emitter configured to emit light having different polarizations and a polarization-selective lens for directing light having different polarizations towards different locations. The multi-channel SMI sensor is configured to measure physical phenomena at two different locations with a small footprint.

20 Claims, 10 Drawing Sheets

(56) References Cited

U.S. PATENT DOCUMENTS

| | | | |
|---|---|---|---|
| 6,597,713 B2 | 7/2003 | Ouchi | |
| 6,636,539 B2 | 10/2003 | Martinsen | |
| 6,814,901 B2 | 11/2004 | Itoh | |
| 6,829,442 B2 | 12/2004 | Murray | |
| 6,931,042 B2 | 8/2005 | Choquette et al. | |
| 6,967,754 B2 | 11/2005 | Bratt et al. | |
| 6,987,306 B2 | 1/2006 | Fathimulla et al. | |
| 7,030,359 B2 | 4/2006 | Römhild | |
| 7,157,298 B2 | 1/2007 | Nakayama et al. | |
| 7,264,408 B2 | 9/2007 | Togami et al. | |
| 7,277,463 B2 | 10/2007 | Guenter | |
| 7,286,766 B2 | 10/2007 | Shelton | |
| 7,324,574 B2 | 1/2008 | Kim | |
| 7,349,604 B2 | 3/2008 | Clark | |
| 7,446,359 B2 | 11/2008 | Lee et al. | |
| 7,692,859 B2 | 4/2010 | Redert | |
| 7,791,591 B2 | 9/2010 | Collins et al. | |
| 7,804,875 B2 | 9/2010 | Park et al. | |
| 8,038,822 B2 | 10/2011 | Kindler | |
| 8,073,343 B2 | 12/2011 | Yuki et al. | |
| 8,113,724 B2 | 2/2012 | Terada et al. | |
| 8,153,502 B2 | 4/2012 | Li | |
| 8,319,311 B2 | 11/2012 | Chen | |
| 8,457,170 B2 | 6/2013 | Gerlach | |
| 8,467,428 B2 | 6/2013 | Gerlach et al. | |
| 8,598,673 B2 | 12/2013 | Joshi | |
| 8,742,350 B2 | 6/2014 | Yao | |
| 8,783,893 B1 | 7/2014 | Seurin et al. | |
| 8,823,859 B2 | 9/2014 | Fujimori et al. | |
| 8,890,844 B2 | 11/2014 | Hung et al. | |
| 8,917,752 B2 | 12/2014 | Chung | |
| 8,976,158 B2 | 3/2015 | Eriksson et al. | |
| 8,988,574 B2 | 3/2015 | Oshima et al. | |
| 8,995,841 B1 | 3/2015 | Chalfant, III et al. | |
| 9,091,747 B2 | 7/2015 | Pruijmboom | |
| 9,112,330 B2 | 8/2015 | Gronenborn et al. | |
| 9,164,625 B2 | 10/2015 | Holmgren et al. | |
| 9,171,723 B2 | 10/2015 | Hallam | |
| 9,215,293 B2 | 12/2015 | Miller | |
| 9,223,054 B2 | 12/2015 | Morita | |
| 9,305,967 B1 | 4/2016 | Tharumalingam | |
| 9,312,954 B2 | 4/2016 | Chen et al. | |
| 9,318,873 B2 | 4/2016 | Nagatomo | |
| 9,397,476 B2 | 7/2016 | Baier | |
| 9,406,716 B2 | 8/2016 | Lin | |
| 9,525,093 B2 | 12/2016 | Costello et al. | |
| 9,544,539 B2 | 1/2017 | Roman | |
| 9,612,390 B2 | 4/2017 | Thompson et al. | |
| 9,684,074 B2 | 6/2017 | Schrank et al. | |
| 9,799,727 B2 | 10/2017 | Zhou | |
| 9,810,862 B2 | 11/2017 | Graves et al. | |
| 9,825,086 B2 | 11/2017 | Kawahara | |
| 9,860,965 B2 | 1/2018 | Recker et al. | |
| 9,917,643 B2 | 3/2018 | Shatz et al. | |
| 9,929,806 B2 | 3/2018 | Wabnig et al. | |
| 9,998,217 B2 | 6/2018 | Li et al. | |
| 10,031,158 B1 | 7/2018 | Douglas et al. | |
| 10,032,946 B2 | 7/2018 | Lanzara et al. | |
| 10,072,815 B2 | 9/2018 | MacKinnon et al. | |
| 10,148,365 B2 | 12/2018 | Sundaram | |
| 10,153,614 B1 | 12/2018 | Lin et al. | |
| 10,177,186 B2 | 1/2019 | Wang | |
| 10,181,895 B2 | 1/2019 | Liu | |
| 10,222,475 B2 | 3/2019 | Pacala et al. | |
| 10,267,505 B2 | 4/2019 | Van de Sluis et al. | |
| 10,293,691 B2 | 5/2019 | Mishra et al. | |
| 10,305,605 B2 | 5/2019 | Sun et al. | |
| 10,353,130 B2 | 7/2019 | Vandenberg et al. | |
| 10,367,021 B2 | 7/2019 | Jangjian | |
| 10,371,328 B2 | 8/2019 | Poage | |
| 10,431,571 B2 | 10/2019 | Rudmann | |
| 10,473,764 B2 | 11/2019 | Townsend | |
| 10,476,591 B2 | 11/2019 | Laycock | |
| 10,511,383 B2 | 12/2019 | Tiecke et al. | |
| 10,571,680 B2 | 2/2020 | Igarashi | |
| 10,574,916 B2 | 2/2020 | Fukuda | |
| 10,601,507 B2 | 3/2020 | Wabnig et al. | |
| 10,663,586 B2 | 5/2020 | Pacala et al. | |
| 10,700,780 B2 | 6/2020 | Momtahan et al. | |
| 10,705,347 B2 | 7/2020 | Chen et al. | |
| 10,756,815 B2 | 8/2020 | Shih et al. | |
| 10,764,053 B2 | 9/2020 | Brook et al. | |
| 10,840,396 B2 | 11/2020 | Balimann et al. | |
| 10,871,820 B2 | 12/2020 | Mutlu et al. | |
| 10,903,913 B2 | 1/2021 | Sundaram | |
| 10,911,727 B2 | 2/2021 | MacKinnon | |
| 10,935,215 B1 | 3/2021 | Lin et al. | |
| 10,948,567 B2 | 3/2021 | Eberspach et al. | |
| 11,092,531 B2 | 8/2021 | Spruit et al. | |
| 11,099,347 B2 | 8/2021 | Takenaka et al. | |
| 11,119,219 B1 | 9/2021 | LaChapelle et al. | |
| 11,157,113 B2 | 10/2021 | Winkler et al. | |
| 11,169,446 B2 | 11/2021 | Dietrich et al. | |
| 11,187,643 B2 | 11/2021 | Jutte et al. | |
| 11,201,669 B2 | 12/2021 | Momtahan et al. | |
| 11,303,355 B2 | 4/2022 | Momtahan | |
| 11,381,060 B2 | 7/2022 | Laflaquiere et al. | |
| 11,381,307 B2 | 7/2022 | Joseph | |
| 11,448,736 B2 | 9/2022 | Hosseini et al. | |
| 11,549,799 B2 | 1/2023 | Tan et al. | |
| 11,789,156 B1 | 10/2023 | Michaels et al. | |
| 11,870,492 B2 | 1/2024 | Momtahan | |
| 11,927,769 B2 * | 3/2024 | Devlin | B82Y 20/00 |
| 2003/0036356 A1 | 2/2003 | Witehira et al. | |
| 2003/0043435 A1 | 3/2003 | Oettinger et al. | |
| 2003/0053506 A1 | 3/2003 | Coldren | |
| 2004/0057228 A1 | 3/2004 | Huang et al. | |
| 2005/0040410 A1 | 2/2005 | Ledentsov et al. | |
| 2005/0168445 A1 | 8/2005 | Piot et al. | |
| 2005/0224701 A1 | 10/2005 | Austin | |
| 2006/0103941 A1 | 5/2006 | Yamaguchi et al. | |
| 2007/0133642 A1 | 6/2007 | Ran et al. | |
| 2011/0278692 A1 | 11/2011 | Takeuchi et al. | |
| 2011/0297832 A1 | 12/2011 | Yao et al. | |
| 2012/0006382 A1 | 1/2012 | Dagli et al. | |
| 2012/0019695 A1 | 1/2012 | Qian et al. | |
| 2014/0213034 A1 | 7/2014 | Chang et al. | |
| 2015/0144918 A1 | 5/2015 | Cho et al. | |
| 2015/0311673 A1 | 10/2015 | Wang et al. | |
| 2016/0178884 A1 | 6/2016 | Hanada et al. | |
| 2016/0306042 A1 | 10/2016 | Schrank et al. | |
| 2018/0278828 A1 | 9/2018 | Moon | |
| 2018/0341094 A1 | 11/2018 | Brukilacchio | |
| 2019/0258175 A1 | 8/2019 | Dietrich et al. | |
| 2019/0331473 A1 | 10/2019 | Johnson et al. | |
| 2019/0369405 A1 | 12/2019 | Chen et al. | |
| 2020/0370922 A1 | 11/2020 | Mort et al. | |
| 2021/0091472 A1 | 3/2021 | Avser | |
| 2021/0119338 A1 | 4/2021 | Avser | |
| 2023/0070943 A1 * | 3/2023 | Vulis | G02B 5/1809 |
| 2023/0089141 A1 * | 3/2023 | Chen | H01S 5/14 |
| | | | 356/450 |
| 2023/0152081 A1 | 5/2023 | Tan et al. | |
| 2023/0213629 A1 | 7/2023 | Zhou et al. | |
| 2024/0102852 A1 | 3/2024 | Hui et al. | |
| 2025/0102630 A1 | 3/2025 | Chen et al. | |
| 2025/0216512 A1 * | 7/2025 | Tan | G01S 7/4815 |
| 2025/0277899 A1 | 9/2025 | Lyon et al. | |

FOREIGN PATENT DOCUMENTS

| | | |
|---|---|---|
| CN | 102427573 | 4/2012 |
| CN | 102575925 | 7/2012 |
| CN | 105716526 | 6/2016 |
| CN | 109154552 | 1/2019 |
| CN | 109428261 | 3/2019 |
| EP | 3176888 | 6/2017 |
| JP | 2000174543 | 6/2000 |
| JP | 2004047636 | 2/2004 |
| JP | 2006203111 | 8/2006 |
| KR | 1020070061191 | 6/2007 |
| KR | 1020190039927 | 4/2019 |
| WO | WO 10/111961 | 10/2010 |
| WO | WO 17/218467 | 12/2017 |

(56)     References Cited

FOREIGN PATENT DOCUMENTS

| WO | WO 18/128904 | 7/2018 |
| WO | WO 22/112679 | 6/2022 |
| WO | WO 23/003550 | 1/2023 |

OTHER PUBLICATIONS

Leitgeb et al., "Using Tapers for Efficient Coupling of Received FSO-Signals into Fibres," 13th International Conference on Transparent Optical Networks in Stockholm, Sweden, Jun. 26-30, 2011, Institute of Broadband Communications, University of Technology, Graz, Austria, pp. 1-6.
Sayyah et al., "Fully Integrated FMCW LiDAR Optical Engine on a Single Silicon Chip," *Journal of Lightwave Technology*, vol. 40, No. 9, May 1, 2022, pp. 2763-2772.
U.S. Appl. No. 18/670,085, filed May 21, 2024, Chen et al.

* cited by examiner

500

502 — DISPLAY

510 — SENSOR(S)

514

504 — PROCESSOR

512 — I/O MECHANISM

506 — POWER SOURCE

508 — MEMORY

MULTI-CHANNEL SELF-MIXING INTERFEROMETRIC SENSOR

CROSS-REFERENCE TO RELATED APPLICATION

This application is a nonprovisional and claims the benefit under 35 U.S.C. § 1.19 (e) of U.S. Provisional Patent Application No. 63/467,207, filed May 17, 2023, the contents of which are incorporated herein by reference as if fully disclosed herein.

TECHNICAL FIELD

Embodiments described herein relate to self-mixing interferometric (SMI) sensors, and in particular to SMI sensors having multiple channels for measuring physical phenomena at multiple locations.

BACKGROUND

Electronic devices such as smartphones and smart watches may include various sensors, which may sense physical phenomena such as movement, environmental conditions, and biometric data about a user. The data from sensors in an electronic device may be used to provide valuable information to a user, such as information about the activity and/or health of the user. Additional sensors in electronic devices may provide more robust information to a user and/or unlock additional applications of the wearable device. Given the wide range of applications for sensors in electronic devices, any new development in the configuration or operation of the sensors therein can be useful. New developments that may be particularly useful are developments that provide additional sensing capability while maintaining a small form factor.

SUMMARY

Embodiments described herein relate to SMI sensors, and in particular to SMI sensors having multiple channels for measuring physical phenomena at multiple locations. In one embodiment, a multi-channel SMI sensor includes a first SMI sensor, a second SMI sensor, and a polarization-selective lens. The first SMI sensor may be configured to emit a first light having a first polarization. The second SMI sensor may be configured to emit a second light having a second polarization. The polarization-selective lens may be configured to direct the first light in a first direction towards a first location and direct the second light in a second direction towards a second location. The polarization-selective lens may further direct a reflected portion of the first light, received from the first location, back towards the first SMI sensor, and direct a reflected portion of the second light, received from the second location, back towards the second SMI sensor. The first SMI sensor may generate a first SMI signal based on self-mixing of the reflected portion of the first light, and the second SMI sensor may generate a second SMI signal based on self-mixing of the reflected portion of the second light.

In one embodiment, the first polarization is a transverse electric polarization and the second polarization is a transverse magnetic polarization.

In one embodiment, the first polarization is a left-handed polarization and the second polarization is a right-handed polarization.

In one embodiment, the first location and the second location are separated by at least 0.5 mm.

In one embodiment, the first SMI sensor and the second SMI sensor are monolithically integrated on a semiconductor die.

In one embodiment, the polarization-selective lens is a metalens.

In one embodiment, the first light and the second light are at least partially overlapping on the polarization-selective lens.

In one embodiment, the first light and the second light are emitted simultaneously.

In one embodiment, a multi-channel SMI sensor includes an SMI sensor and a polarization-selective lens. The SMI sensor may be configured to emit a light having a mixed polarization. Specifically, the light may include a first polarization and a second polarization. The polarization-selective lens may be configured to direct light having the first polarization in a first direction towards a first location and direct light having the second polarization in a second direction towards the second location. The polarization-selective lens may further direct a reflected portion of the light having the first polarization, received from the first location, and a reflected portion of the light having the second polarization, received from the second location, back towards the SMI sensor. The SMI sensor may generate an SMI signal based on self-mixing of both the reflected portion of the light having the first polarization and the reflected portion of the light having the second polarization.

In one embodiment, the polarization-selective lens is further configured to direct a portion of light having the second polarization, received from the first location, back towards the SMI sensor and direct a portion of light having the first polarization, received from the second location, back towards the SMI sensor. The first location and the second location may be on the surface of an object. The portion of light having the second polarization at the first location may enter the surface at the second location and exit the surface at the first location. The portion of light having the first polarization at the second location may enter the surface at the first location and exit the surface at the second location.

In one embodiment, the first polarization is a transverse electric polarization and the second polarization is a transverse magnetic polarization.

In one embodiment, the first polarization is a left-handed polarization and the second polarization is a right-handed polarization.

In one embodiment, the first location and the second location are separated by at least 0.5 mm.

In one embodiment, the polarization-selective lens is a metalens.

In one embodiment, a multi-channel SMI sensor includes an SMI sensor and a polarization-selective lens. The SMI sensor may be configured to emit a first light having a first polarization in response to a first control signal, and emit a second light having a second polarization in response to a second control signal. The polarization-selective lens may be configured to direct the first light in a first direction towards a first location and direct the second light in a second direction towards a second location. The polarization-selective lens may further direct a reflected portion of the first light, received from the first location, back towards the SMI sensor, and direct a reflected portion of the second light, received from the second location, back towards the SMI sensor. The SMI sensor may generate a first SMI signal based on self-mixing of the reflected portion of the first light and generate a second SMI signal based on self-mixing of the reflected portion of the second light.

In one embodiment, the polarization-selective lens is a metalens.

In one embodiment, the first polarization is a transverse electric polarization and the second polarization is a transverse magnetic polarization.

In one embodiment, the first polarization is a left-handed polarization and the second polarization is a right-handed polarization.

In one embodiment, the first control signal has a different current than the second control signal.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
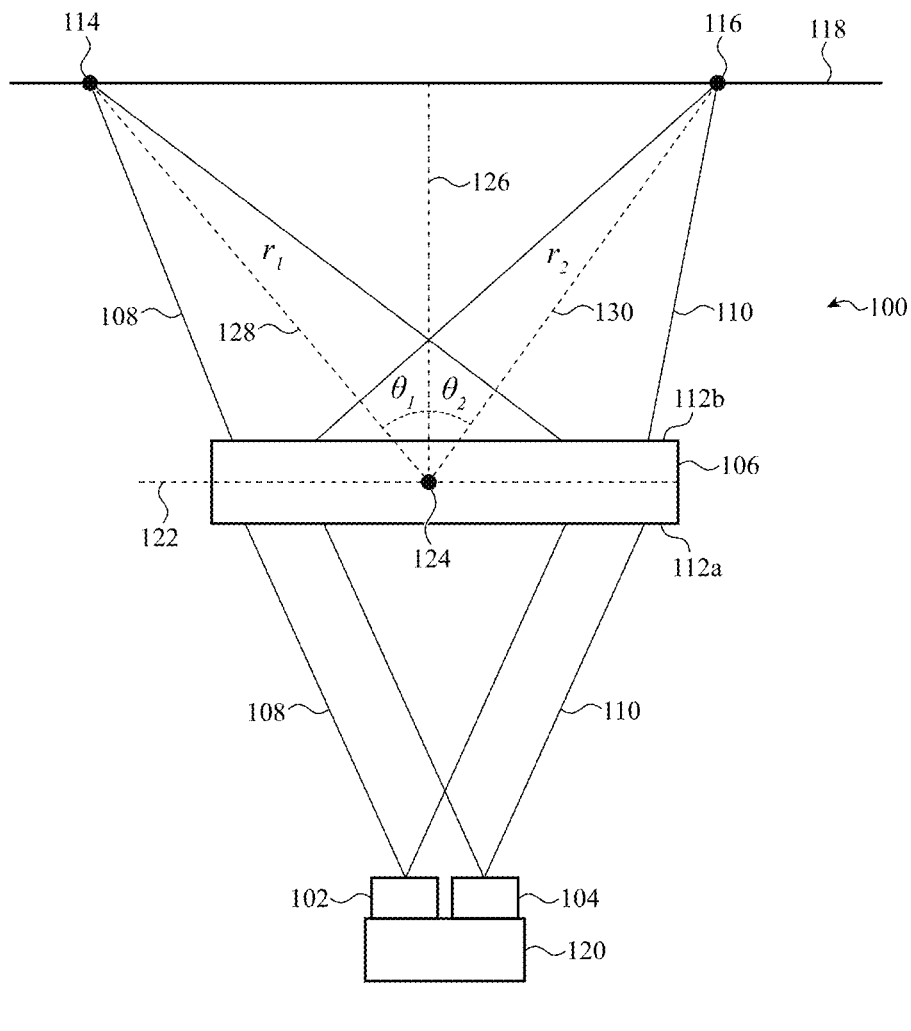
FIG. 1 depicts a multi-channel SMI sensor, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Certain accompanying figures include vectors, rays, traces, and/or other visual representations of one or more example paths-which may include reflections, refractions, diffractions, and so on, through one or more mediums—that may be taken by, or may be presented to represent, one or more photons, wavelets, or other propagating electromagnetic energy originating from, or generated by, one or more antennas shown or, or in some cases, omitted from, the accompanying figures. It is understood that these simplified visual representations of electromagnetic energy regardless of spectrum (e.g., radio, microwave, VHF, UHF, and so on) are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, or direction, to the exclusion of other embodiments described or referenced herein.

Similarly, certain accompanying figures include vectors, rays, traces, and/or other visual representations of one or more example paths-which may include reflections, refractions, diffractions, and so on, through one or more mediums—that may be taken by, or may be presented to represent, one or more photons, wavelets, or other propagating electromagnetic energy originating from, or generated by, one or more light sources shown or, in some cases, omitted from, the accompanying figures. It is understood that these simplified visual representations of light or, more generally, electromagnetic energy, regardless of spectrum (e.g., ultraviolet, visible light, infrared, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Coherent optical sensing, including Doppler velocimetry and heterodyning, can be used to measure physical phenomena including presence, distance, velocity, size, surface properties, and particle count. Interferometric sensors such as SMI sensors may be used to perform coherent optical sensing. An SMI sensor is defined herein as a sensor that is configured to generate and emit light from a resonant cavity of a semiconductor light source, receive a reflection or backscatter of the light (e.g., light reflected or backscattered from an object) back into the resonant cavity, coherently or partially coherently self-mix the generated and reflected/backscattered light within the resonant cavity, and produce an output indicative of the self-mixing (i.e., an SMI signal). The generated, emitted, and received light may be coherent or partially coherent, but a semiconductor light source capable of producing such coherent or partially coherent light may be referred to herein as a coherent light source. The generated, emitted, and received light may include, for example, visible or invisible light (e.g., green light, infrared (IR) light, or ultraviolet (UV) light). The output of an SMI sensor (i.e., the SMI signal) may include a photocurrent produced by a photodetector (e.g., a photodiode). Alternatively or additionally, the output of an SMI sensor may include a measurement of a current or junction voltage of the SMI sensor's semiconductor light source.

Generally, an SMI sensor may include a light source and, optionally, a photodetector. The light source and photodetector may be integrated into a monolithic structure. Examples of semiconductor light sources that can be integrated with a photodetector include vertical cavity surface-emitting lasers (VCSELs), edge-emitting lasers (EELs), horizontal cavity surface-emitting lasers (HCSELs), vertical external-cavity surface-emitting lasers (VECSELs), quantum-dot lasers (QDLs), quantum cascade lasers (QCLs), and light-emitting diodes (LEDs) (e.g., organic LEDs (OLEDs), resonant-cavity LEDs (RC-LEDs), micro LEDs (mLEDs), superluminescent LEDs (SLEDS), and edge-emitting LEDs (ELEDs). These light sources may also be referred to as coherent light sources. A semiconductor light source may be integrated with a photodetector in an intra-cavity, stacked, or adjacent photodetector configuration to provide an SMI sensor.

Embodiments described herein relate to SMI sensors, and in particular to SMI sensors having multiple channels for measuring physical phenomena at multiple locations. SMI sensors described herein may utilize a polarization-selective lens to direct first light having a first polarization in a first direction towards a first location and direct second light having a second polarization in a second direction towards a second location. In one embodiment, the first light is emitted by a first SMI sensor and the second light is emitted by a second SMI sensor. The polarization-selective lens may further direct a reflected portion of the first light, received from the first location, back towards the first SMI sensor, and direct a reflected portion of the second light, received from the second location, back towards the second SMI sensor. The first SMI sensor may generate a first SMI signal based on self-mixing of the reflected portion of the first light, and the second SMI sensor may generate a second SMI signal based on self-mixing of the reflected portion of the second light. The polarization-selective lens may allow the first light and second light to overlap while still providing separate measurement locations. Accordingly, the first SMI sensor and the second SMI sensor may be located very close to one another, and in some embodiments may be monolithically integrated on the same semiconductor dic. Accordingly, a multi-channel SMI sensor may be provided in an extremely compact footprint.

In some embodiments, only a single SMI sensor is used to measure physical phenomena at multiple points of interest. For example, a single SMI sensor may be configured to emit light having a mixed polarization. Specifically, the light may include the first polarization and the second polarization. The polarization-selective lens may operate as described above to direct light having the first polarization towards the first location and direct light having the second polarization towards the second location. The polarization-selective lens may further direct a reflected portion of the light having the first polarization and a reflected portion of the light having the second polarization back towards the single SMI sensor. The single SMI sensor may generate an SMI signal based on self-mixing of both the reflected portion of the light having the first polarization and the reflected portion of the light having the second polarization.

As another example, a single SMI sensor may be configured to emit first light having the first polarization in response to a first control signal, and emit second light having the second polarization in response to a second control signal. The polarization-selective lens may operate as described above to direct light having the first polarization towards the first location and direct light having the second polarization towards the second location. The polarization-selective lens may further direct a reflected portion of the light having the first polarization and a reflected portion of the light having the second polarization back towards the single SMI sensor. The single SMI sensor may generate a first SMI signal based on self-mixing of the reflected portion of the first light and generate a second SMI signal based on self-mixing of the reflected portion of the second light.

These foregoing and other embodiments are discussed below with reference to FIGS. 1-8. However, those skilled in the art will readily appreciate that the detailed description given herein with respect to these figures is for explanation only and should not be construed as limiting.

FIG. 1 shows an exemplary multi-channel SMI sensor 100. The multi-channel SMI sensor 100 includes a first SMI sensor 102, a second SMI sensor 104, and a polarization-selective lens 106. The first SMI sensor 102 is configured to emit first light 108 having a first polarization. The second SMI sensor 104 is configured to emit second light 110 having a second polarization that is different than the first polarization. For example, the first light 108 may have a transverse electric polarization and the second light 110 may have a transverse magnetic polarization. Alternatively, the first light 108 may have a left-handed polarization and the second light 110 may have a right-handed polarization. Notably, these polarization types are merely exemplary; the first light 108 and the second light 110 may have any polarization type. The first SMI sensor 102 and the second SMI sensor 104 may be configured to emit the first light 108 and the second light 110 simultaneously.

The polarization-selective lens 106 may be configured to receive the first light 108 and the second light 110 at a first surface 112*a*, direct the first light 108 from a second surface 112*b* towards a first location 114, and direct the second light 110 from the second surface 112*b* towards a second location 116. Generally, the polarization-selective lens 106 is configured to shape the first light 108 differently than the second light 110 such that the first light 108 travels in a first direction towards the first location 114 and the second light 110 travels in a second direction towards the second location 116. As discussed herein, directing light may include focusing light, such that the polarization-selective lens 106 is configured to focus the first light 108 at the first location 114 and focus the second light 110 at the second location 116. The first light 108 may thus be a first light beam and the second light 110 may be a second light beam. The first and second light beams may be any type of light beams. In particular, the first and second light beams may have a circular cross-section in some embodiments, but generally may have any cross-section. The first and second light beams may include a plurality of light rays, each directed towards the first location 114 and the second location 116, respectively. Notably, the first light 108 and the second light 110 may be at least partially overlapping at the first surface 112*a* of the polarization-selective lens 106, allowing the first SMI sensor 102 and the second SMI sensor 104 to be very close to one other.

As discussed above, the polarization-selective lens 106 may be configured to direct the first light 108 in a first direction towards the first location 114 and direct the second light 110 in a second direction towards the second location 116. The first direction and the second direction may be defined as vectors in a spherical coordinate system defined by a reference plane 122 including an optical center 124 of the polarization-selective lens 106 and an optical axis 126 perpendicular to the reference plane 122 through the optical center 124. In particular, the first direction may be a first vector 128 between the first location 114 and the optical center 124 and the second direction may be a second vector 130 between the second location 116 and the optical center 124. The first vector 128 may define a first beam axis through a center of a beam including the first light 108. The second vector 130 may define a second beam axis through a center of a beam including the second light 110. The first vector 128 may be defined by a first inclination angle $\theta_1$ between the first vector 128 and the optical axis 126. The second vector may be defined by a second inclination angle $\theta_2$ between the second vector 130 and the optical axis 126. Further, the first vector 128 may be defined by a first radius $r_1$, which is a distance between the optical center 124 and the first location 114. The second vector 130 may define a second radius $r_2$, which is a distance between the optical center 124 and the second location 116.

The first location 114 and the second location 116 may be different locations on a surface 118 of an object. Accordingly, part of the first light 108 may reflect and/or backscatter from the surface 118 at or around the first location 114, and part of the second light 110 may reflect and/or backscatter from the surface 118 at or around the second location 116. As discussed herein, reflected and/or backscattered light may be referred to simply as reflected light. The polarization-selective lens 106 may be configured to direct a reflected portion of the first light 108, received from the first location 114, back towards the first SMI sensor 102. Similarly, the polarization-selective lens 106 may be configured to direct a reflected portion of the second light 110, received from the second location 116, back towards the second SMI sensor 104.

The first SMI sensor 102 may be configured to generate a first SMI signal based on self-mixing of the reflected portion of the first light 108 received from the first location 114, where the first SMI signal represents a measurement of a physical phenomena at the first location 114. Similarly, the second SMI sensor 104 may be configured to generate a second SMI signal based on self-mixing of the reflected portion of the second light 110 received from the second location 116, where the second SMI signal represents a measurement of a physical phenomena at the second location 116.

Conventionally, measuring physical phenomena at two different locations requires separating SMI sensors enough so that the light emitted therefrom does not overlap on a lens, or providing separate lenses for each SMI sensor. Generally, this results in a relatively large footprint. Using the polarization-selective lens 106 allows the first SMI sensor 102 and the second SMI sensor 104 to be placed very close to one another such that the light emitted therefrom is overlapping on the first surface 112a of the polarization-selective lens 106, while still directing light from each to separate locations and thus providing separate measurement locations. In some embodiments, the first SMI sensor 102 and the second SMI sensor 104 are monolithically integrated on the same semiconductor die 120. Accordingly, the multi-channel SMI sensor 100 may be much smaller than previous solutions.

The first SMI sensor 102 and the second SMI sensor 104 may be any type of SMI sensor. Generally, the first SMI sensor 102 and the second SMI sensor 104 will each include a light emitter (e.g., a VCSEL or the like) to generate light. The first SMI sensor 102 and the second SMI sensor 104 further may each include a filter or grating, which may be used to polarize the generated light. The first SMI sensor 102 and the second SMI sensor 104 may each further include a cavity or other area for self-mixing of generated and reflected/backscattered light. Finally, the first SMI sensor 102 and the second SMI sensor 104 may each include a photodetector to measure the self-mixed light and generate the SMI signals therefrom. However, in some embodiments the photodetector may be omitted and a current or junction voltage of the emitter (which may vary as a result of self-mixing) may be used to generate the SMI signals therefrom.

While not shown, the concepts discussed above may be applied to provide more than two measurement locations or channels. For example, while not shown, the multi-channel SMI sensor 100 may include three, four, or more SMI sensors, each emitting light having different polarizations. The polarization-selective lens 106 may direct light from each of the SMI sensors in different directions towards different locations, and direct reflected portions of light received from the different locations back towards the appropriate SMI sensors, each of which generates an SMI signal indicative of physical phenomena at a different location.

In some embodiments, the polarization-selective lens 106 is a metalens. As discussed herein, a metalens is a lens comprising a metasurface, or a flat surface on which a number of nanostructures are provided. The nanostructures are designed and arranged to impart customized polarization, amplitude, and phase to incident light. In the context of the present disclosure, the nanostructures may be designed to direct first light having a first polarization in a first direction towards a first location and direct second light having a second polarization in a second direction towards a second location. The nanostructures may do so even when the first light and second light are provided in an overlapping fashion on the metasurface. However, the polarization-selective lens 106 may be any type of lens configured to direct light having different polarizations towards different locations as discussed herein.

Figure 2A:
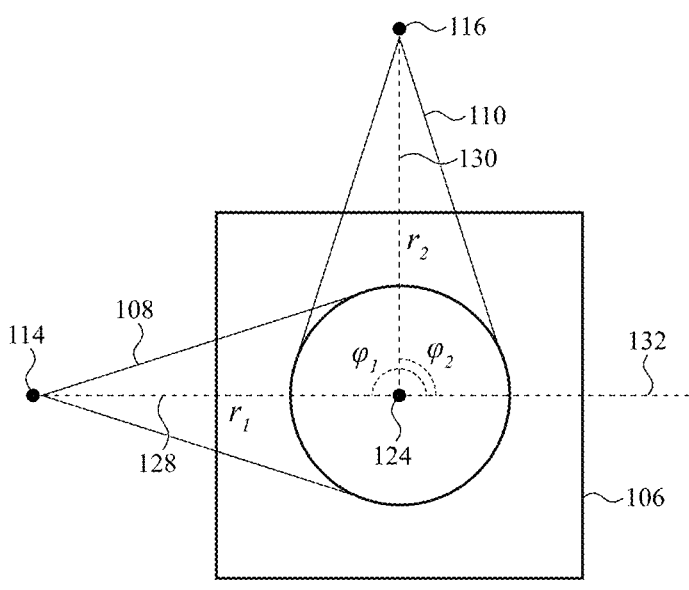
FIGS. 2A and 2B depict a top-down view of a multi-channel SMI sensor, such as described herein.
Figure 2B:
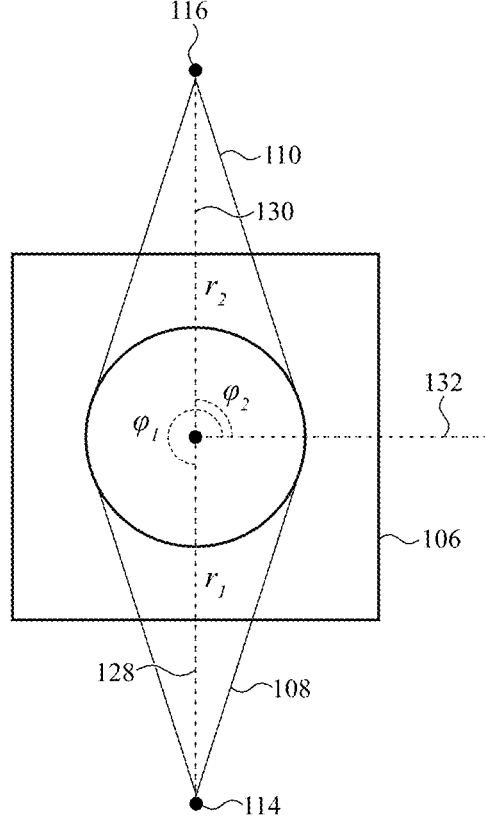

FIGS. 2A and 2B show exemplary overhead views of the multi-channel SMI sensor 100. The overhead views are meant to illustrate examples of how the polarization-selective lens 106 directs light to determine the first location 114 and the second location 116, and specifically how the polarization-selective lens 106 can be designed to provide the first location 114 and the second location 116 at any arbitrary locations in space. FIG. 2A shows the first location 114 and the second location 116 provided having a first spatial relationship, while FIG. 2B shows the first location 114 and the second location 116 having a second spatial relationship. Specifically, in the spherical coordinate system discussed in which the first vector 128 and the second vector 130 are defined by an inclination angle $\theta$ and a radius r, each of the first vector 128 and the second vector 130 may further be defined by an azimuthal angle $\varphi$ between a reference axis 132, which is in the reference plane 122, and the respective vectors. In particular, the first vector 128 may be defined by a first azimuthal angle $\varphi_1$ and the second vector 130 may be defined by a second azimuthal angle $\varphi_2$. In FIG. 2A, the first vector 128 and the second vector 130 have the same radius r, and the first azimuthal angle $\varphi_1$ and the second azimuthal angle $\varphi_2$ are separated by 90°. In FIG. 2B, the first vector 128 and the second vector 130 have the same radius r, and the first azimuthal angle $\varphi_1$ and the second azimuthal angle $\varphi_2$ are separated by 180°. Generally, the polarization-selective lens 106 may be designed to define the first vector 128 and the second vector 130, and thus the first location 114 and the second location 116, having any desired radius r, inclination angle $\theta$, and azimuthal angle $\varphi$.

In various embodiments, the first inclination angle $\theta_1$ and the second inclination angle $\theta_2$ may be separated by at least 15°, at least 45°, and at least 90°. Further, the first azimuthal angle $\varphi_1$ and the second azimuthal angle $\theta_2$ may be separated by at least 15°, at least 45°, at least 90°, at least 180, and at least 270°. In various embodiments, a distance between the first location 114 and the second location 116 may be at least 0.5 mm, at least 1.0 mm, at least 1.5 mm, and at least 2.0 mm. In various embodiments, a distance between the first SMI sensor 102 and the second SMI sensor may be less than 100 μm, less than 50 μm, and less than 25 μm.

In one embodiment, the first location 114 and the second location 116 may overlap, but the first vector 128 and the second vector 130 may be different such that the first light 108 and the second light 110 arrive at the first location 114 and the second location 116 via different paths.

Figure 3:
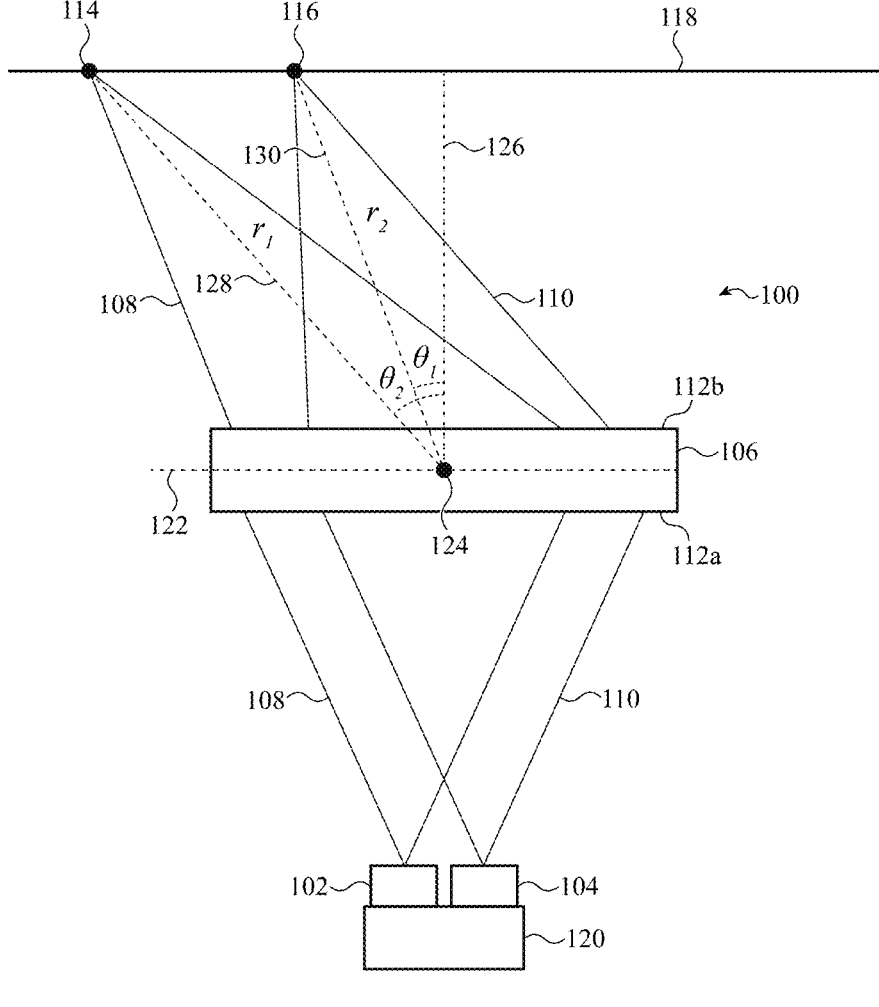
FIG. 3 depicts a multi-channel SMI sensor, such as described herein.
Figure 4:
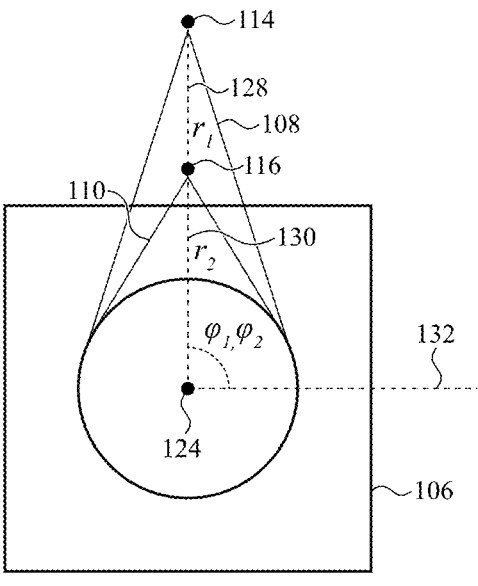
FIG. 4 depicts a top-down view of a multi-channel SMI sensor, such as described herein.

FIG. 3 shows the multi-channel SMI sensor 100 wherein the polarization-selective lens 106 is configured to direct the first light 108 and the second light 110 in the same direction. The multi-channel SMI sensor 100 shown in FIG. 3 is substantially similar to that discussed above with respect to FIG. 1, except that the second inclination angle $\theta_2$ is substantially smaller, thus making the difference between first inclination angle $\theta_1$ and the second inclination angle $\theta_2$ substantially smaller and causing the first light 108 and the second light 110 to be provided in the same direction. FIG. 4 shows an overhead view of the multi-channel SMI sensor 100. As shown, the first vector 128 and the second vector 130 have the same azimuthal angle $\varphi$ with different radii r. FIGS. 3 and 4 are provided to further illustrate that the polarization-selective lens 106 may be designed to define the first location 114 and the second location 116 in any desired manner.

Figure 5:
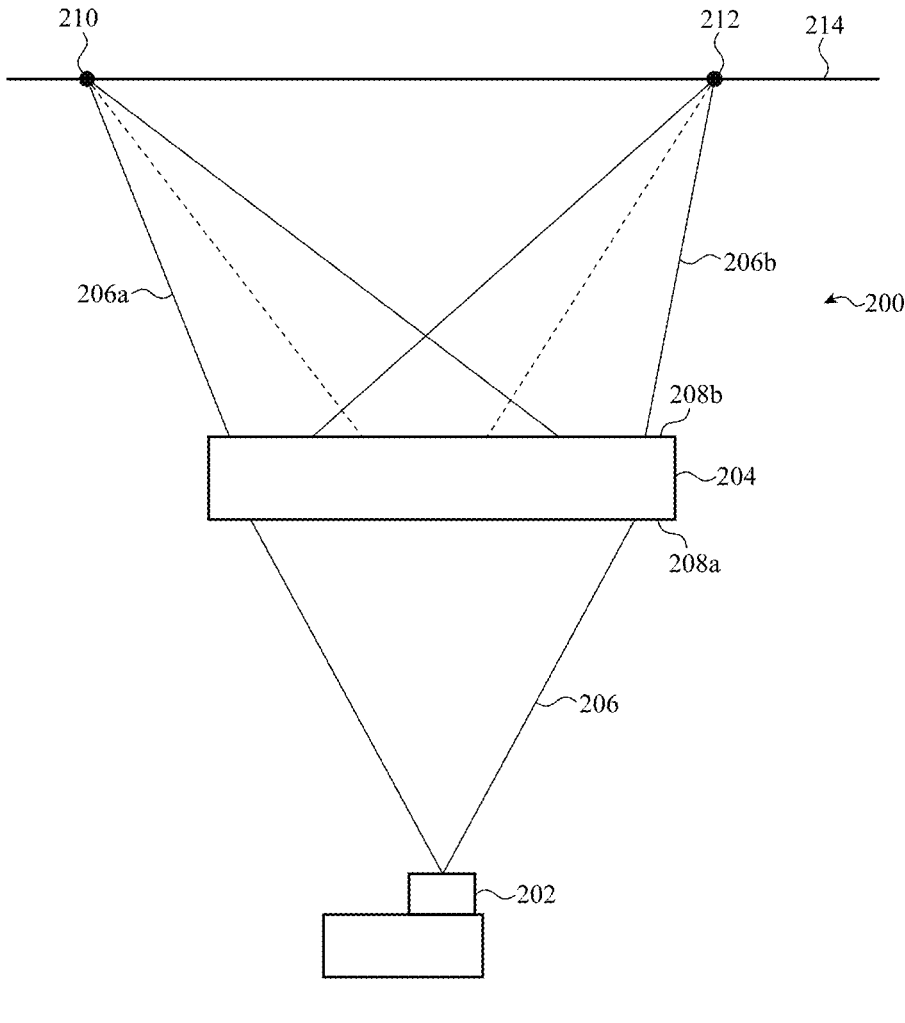
FIG. 5 depicts a multi-channel SMI sensor, such as described herein.

FIG. 5 shows a multi-channel SMI sensor 200 according to an additional embodiment of the present disclosure. The multi-channel SMI sensor 200 includes an SMI sensor 202 and a polarization-selective lens 204. The SMI sensor 202 is configured to emit light 206 having a mixed polarization. In particular, the SMI sensor 202 is configured to emit light including a first polarization and a second polarization. As discussed above, the first polarization may be a transverse electric polarization and the second polarization may be a transverse magnetic polarization. Alternatively, the first polarization may be a left-handed polarization and the second polarization may be a right-handed polarization. Notably, these polarization types are merely exemplary; the first polarization and the second polarization may be any different polarization types. The SMI sensor 202 may be configured to emit light having both the first polarization and the second polarization (i.e., mixed polarization) simultaneously.

The polarization-selective lens 204 may be configured to receive the light having the mixed polarization at a first surface 208a, direct light having the first polarization 206a from a second surface 208b in a first direction towards a first location 210, and direct light having the second polarization 206b from the second surface 208b in a second direction towards a second location 212. As discussed above, directing light may include focusing light, such that the polarization-selective lens 204 is configured to focus the light having the first polarization at the first location 210 and focus the light having the second polarization at the second location 212. Notably, the light having the first polarization 206a and the light having the second polarization 206b may be at least partially overlapping at the first surface 208a of the polarization-selective lens 204, and may be completely overlapping since they are provided as light having mixed polarization from the same SMI sensor.

The first location 210 and the second location 212 may be different locations on a surface 214 of an object. Accordingly, a portion of the light having the first polarization may reflect and/or backscatter from the surface 214 at or around the first location 210, and a portion of the light having the second polarization may reflect and/or backscatter from the surface 214 at or around the second location 212. The polarization-selective lens 204 may be configured to direct a reflected portion of the light having the first polarization 206a, received from the first location 210, back towards the SMI sensor 202. Similarly, the polarization-selective lens 204 may be configured to direct a reflected portion of the light having the second polarization 206b, received from the second location 212, back towards the SMI sensor 202. Depending on the physical characteristics of the surface 214 and/or the object, a portion of the light having the first polarization may enter the surface 214 at the first location 210 and exit the surface 214 at the second location 212, and a portion of the light having the second polarization may enter the surface 214 at the second location 212 and exit the surface 214 at the first location 210. The polarization-selective lens 204 may be configured to direct a portion of light having the second polarization, received from the first location 210, back towards the SMI sensor 202 and direct a portion of light having the first polarization, received from the second location 212, back towards the SMI sensor 202.

The SMI sensor 202 may be configured to generate an SMI signal based on self-mixing of the reflected portion of light having the first polarization and the reflected portion of light having the second polarization. Since the reflected portion of light is provided from two locations on the surface 214 and may include light that has entered the surface 214 at the first location 210 and exited the surface 214 at the second location 212, and vice-versa, the SMI signal may include additional information about the surface 214 and/or object, and thus may be useful for measuring physical phenomena not possible with a single point of measurement, such as volume and multi-surface backscattering.

As discussed above, conventional ways to measure physical phenomena at two different locations would require multiple SMI sensors separated by enough distance so that light emitted therefrom does not overlap on a lens, or have separate non-overlapping lenses. Using the polarization-selective lens 204 allows a single SMI sensor 202 to measure physical phenomena at two different locations. Accordingly, the multi-channel SMI sensor 200 may be much smaller than previous solutions.

As discussed above, the SMI sensor 202 may be any type of SMI sensor. Generally, the SMI sensor 202 includes a light emitter (e.g., a VCSEL or the like) to generate light. The SMI sensor 202 may further include a filter or grating, which may be used to polarize the generated light. The SMI sensor 202 may further include a cavity or other area for self-mixing of the generated and reflected/backscattered light. Finally, the SMI sensor 202 may include a photodetector to measure the self-mixed light and generate SMI signals therefrom. However, in some embodiments the photodetector may be omitted and a current or junction voltage of the emitter (which may vary as a result of self-mixing) may be used to generate the SMI signals.

While not shown, the concepts discussed above may be applied to provide more than two measurement locations or channels. For example, the SMI sensor 202 may generate light having three, four, or more polarizations therein. The polarization-selective lens 204 may direct the differently polarized lights in different directions and thus to different locations, and direct reflected portions of light back towards the SMI sensor 202 from each location. The SMI sensor 202 may then operate as described above to generate an SMI signal indicative of physical phenomena at each measurement location.

The polarization-selective lens 204 may be a metalens. As discussed above, a metalens is a lens comprising a metasurface, or a flat surface on which a number of nanostructures are provided. The nanostructures are designed and arranged to impart customized polarization, amplitude, and phase to incident light. In the context of the present disclosure, the nanostructures may be designed to direct first light having a first polarization in a first direction towards a first location and direct second light having a second polarization in a second direction towards a second location. The nanostructures may do so even when the first light and second light are provided in an overlapping fashion on the metasurface. However, the polarization-selective lens 204 may be any type of lens configured to direct light having different polarizations towards different locations as discussed herein.

Figure 6A:
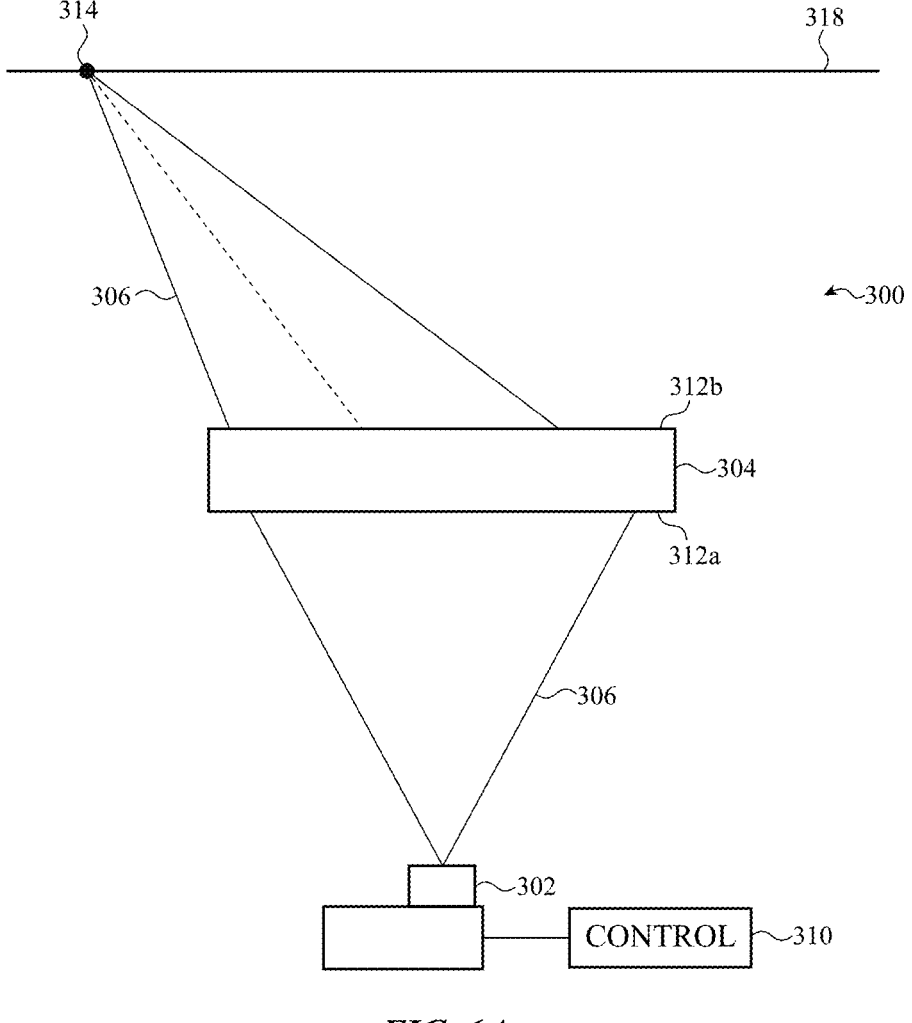
FIGS. 6A and 6B depict a multi-channel SMI sensor, such as described herein.
Figure 6B:
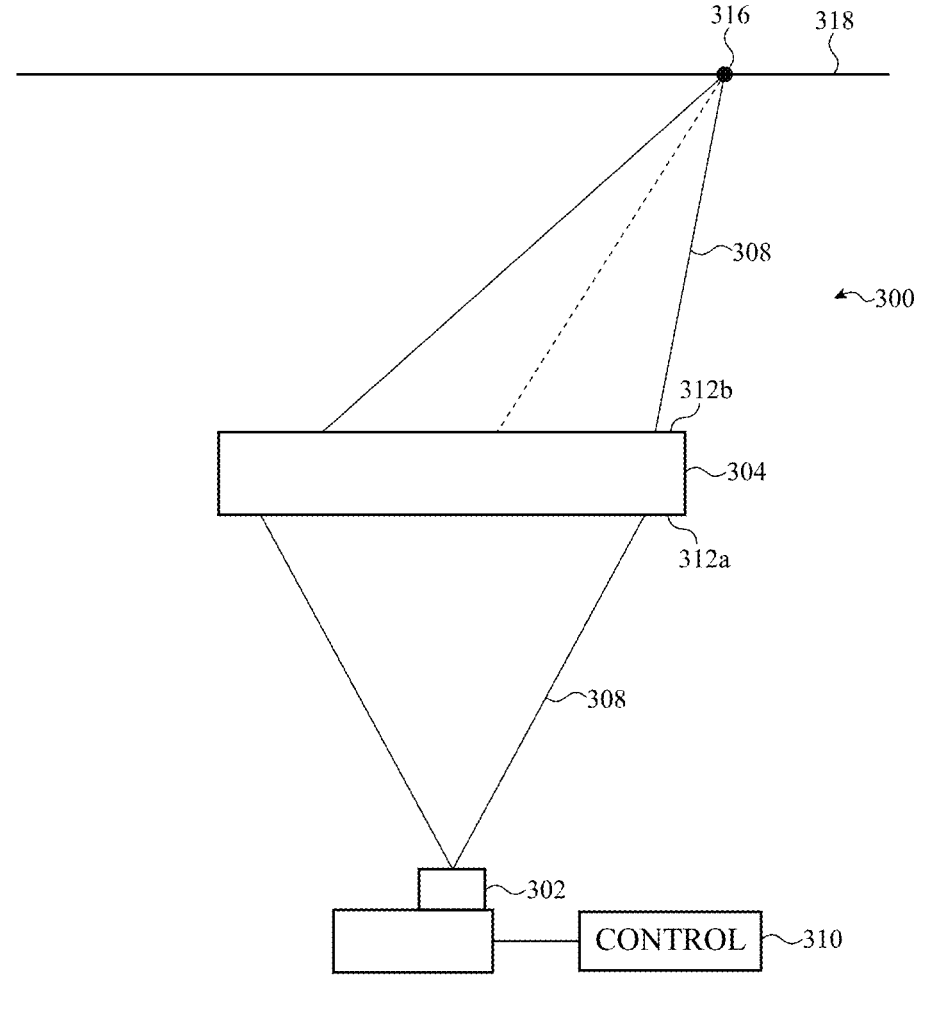

FIGS. 6A and 6B show a multi-channel SMI sensor 300 according to an additional embodiment of the present disclosure. The multi-channel SMI sensor 300 includes an SMI sensor 302 and a polarization-selective lens 304. The SMI sensor 302 may be configured to emit first light 306 having a first polarization in response to a first control signal, as shown in FIG. 3A, and emit second light 308 having a second polarization in response to a second control signal, as shown in FIG. 3B. As discussed above, the first polarization may be a transverse electric polarization and the second polarization may be a transverse magnetic polarization. Alternatively, the first polarization may be a left-handed polarization and the second polarization may be a right-handed polarization. Notably, these polarization types are merely exemplary; the first polarization and the second polarization may be any different polarization types. Control circuitry 310 may be coupled to the SMI sensor 302 to provide the first control signal and the second control signal. In some embodiments, the control circuitry 310 provides the first control signal and the second control signal in a time-multiplexed fashion such that during a first time period the first control signal is provided and the SMI sensor 302 emits the first light 306 and during a second time period the second control signal is provided and the SMI sensor emits the second light 308.

The first control signal and the second control signal may be different signals. In particular, the first control signal and the second control signal may have different currents or powers. For example, the first control signal may have a first current while the second control signal has a second current. Generally, emitters used in SMI sensors may provide light having different polarizations based on temperature and power. By controlling the temperature and/or power with the first control signal and the second control signal, a single emitter may thus be able to emit light having different polarizations. The present disclosure contemplates any control signals usable to vary a polarization of light provided from an emitter. In some embodiments, the first control signal and the second control signal may be the same signal provided in a time-multiplexed fashion. Further, the first control signal and the second control signal may be combined into a single control signal, which is operable to operate the SMI sensor 302 as discussed herein.

The polarization-selective lens 304 may be configured to receive the first light 306 and the second light 308 at a first surface 312a, direct the first light 306 from a second surface

312b in a first direction towards a first location 314, and direct the second light 308 from the second surface 312b in a second direction towards a second location 316. As discussed herein, directing light may include focusing light, such that the polarization-selective lens 304 is configured to focus the first light 306 at the first location 314 and focus the second light 308 at the second location 316. Notably, the first light 306 and the second light 308 may be at least partially overlapping at the first surface 312a of the polarization-selective lens 304, and may be completely overlapping since they are provided from the same SMI sensor.

The first location 314 and the second location 316 may be different locations on a surface 318 of an object. Accordingly, a portion of the first light 306 may reflect and/or backscatter from the surface 318 at or around the first location 314, and a portion of the second light 308 may reflect and/or backscatter from the surface 318 at or around the second location 316. The polarization-selective lens 304 may be configured to direct a reflected portion of the first light 306, received from the first location 314, back towards the SMI sensor 302. Similarly, the polarization-selective lens 304 may be configured to direct a reflected portion of the second light 308, received from the second location 316, back towards the SMI sensor 302. Depending on the physical characteristics of the surface 318 and/or the object, some of the first light 306 may enter the surface 318 at the first location 314 and exit the surface 318 at the second location 316, and some of the second light 308 may enter the surface 318 at the second location 316 and exit the surface 318 at the first location 314. The polarization-selective lens 304 may be configured to direct a portion of the second light 308, received from the first location 314, back towards the SMI sensor 302 and direct a portion of the first light 306, received from the second location 316, back towards the SMI sensor 302.

The SMI sensor 302 may be configured to generate a first SMI signal based on self-mixing of the first light 306 and generate a second SMI signal based on self-mixing of the second light 308. Since only one of the first light 306 or the second light 308 is provided at a time as discussed above, the SMI sensor 302 may generate the first SMI signal and the second SMI signal in a time-multiplexed fashion, such that the first SMI signal is generated during the first time period and the second SMI signal is generated during the second time period discussed above. Depending on how the SMI sensor 302 is operated, the first SMI signal may include information from self-mixing of a portion of the second light 308 that entered the surface 318 at the second location 316 and exited the surface 318 at the first location 314, and the second SMI signal may include information from self-mixing of a portion of the first light 306 that entered the surface 318 at the first location 314 and existed the surface 318 at the second location 316. Accordingly, the first SMI signal and the second SMI signal may include additional information about the surface 318 and/or object, and thus may be useful in measuring physical phenomena not possible with a single point of measurement, such as volume and multi-surface backscattering.

As discussed above, conventional ways to measure physical phenomena at two different locations would require multiple SMI sensors separated by enough distance so that light emitted therefrom does not overlap on a lens, or having separate non-overlapping lenses. Using the polarization-selective lens 304 allows a single SMI sensor 302 to measure physical phenomena at two different locations. Accordingly, the multi-channel SMI sensor 300 may be much smaller than previous solutions.

As discussed above, the SMI sensor 302 may be any type of SMI sensor. Generally, the SMI sensor includes a light emitter (e.g., a VCSEL or the like) to generate light. The SMI sensor 302 may further include a filter or grating, which may be used to polarize the generated light. The SMI sensor 302 may further include a cavity or other area for self-mixing of the generated and reflected/backscattered light. Finally, the SMI sensor 302 may include a photodetector to measure the self-mixed light and generate SMI signals therefrom. However, in some embodiments the photodetector may be omitted and a current or junction voltage of the emitter (which may vary as a result of self-mixing) may be used to generate the SMI signals.

While not shown, the concepts discussed above may be applied to provide more than two measurement locations or channels. For example, the SMI sensor 302 may generate light having three, four, or more polarizations in response to additional control signals. The polarization-selective lens 304 may direct the differently polarized lights at different directions and thus to different locations, and direct reflected portions of light back towards the SMI sensor 302 from each location. The SMI sensor 302 may then operate as described above to generate SMI signals indicative of physical phenomena at the different locations.

The polarization-selective lens 304 may be a metalens. As discussed above, a metalens is a lens comprising a metasurface, or a flat surface on which a number of nanostructures are provided. The nanostructures are designed and arranged to impart customized polarization, amplitude, and phase to incident light. In the context of the present disclosure, the nanostructures may be designed to direct first light having a first polarization in a first direction towards a first location and direct second light having a second polarization in a second direction towards a second location. The nanostructures may do so even when the first light and second light are provided in an overlapping fashion on the metasurface. However, the polarization-selective lens 304 may be any type of lens configured to direct light having different polarizations towards different locations as discussed herein.

Figure 7A:
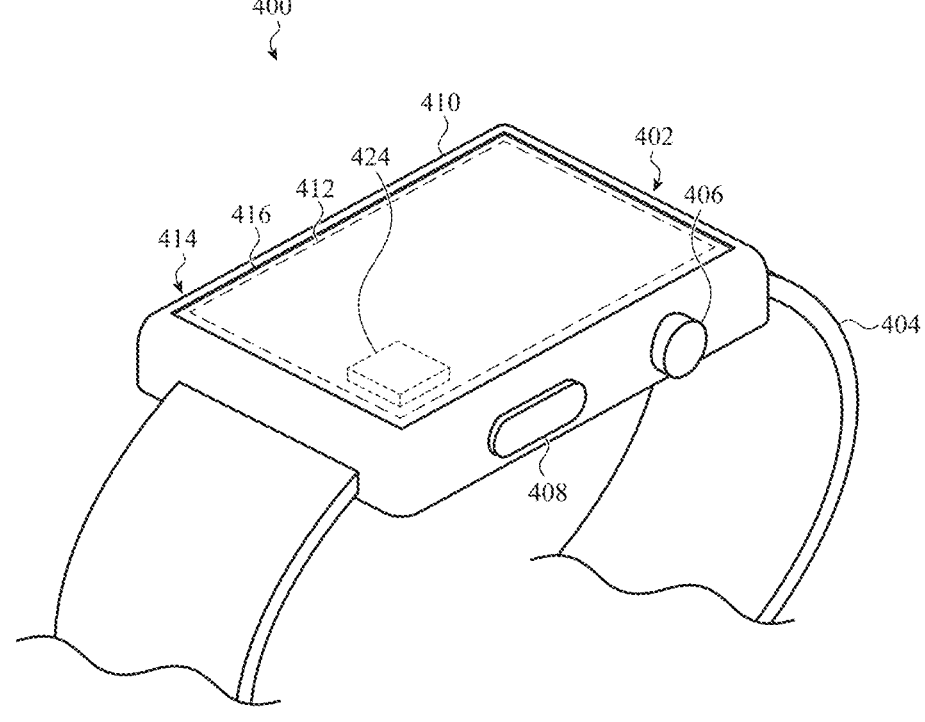
FIGS. 7A and 7B illustrate a wearable device that may incorporate a multi-channel SMI sensor, such as described herein.
Figure 7B:
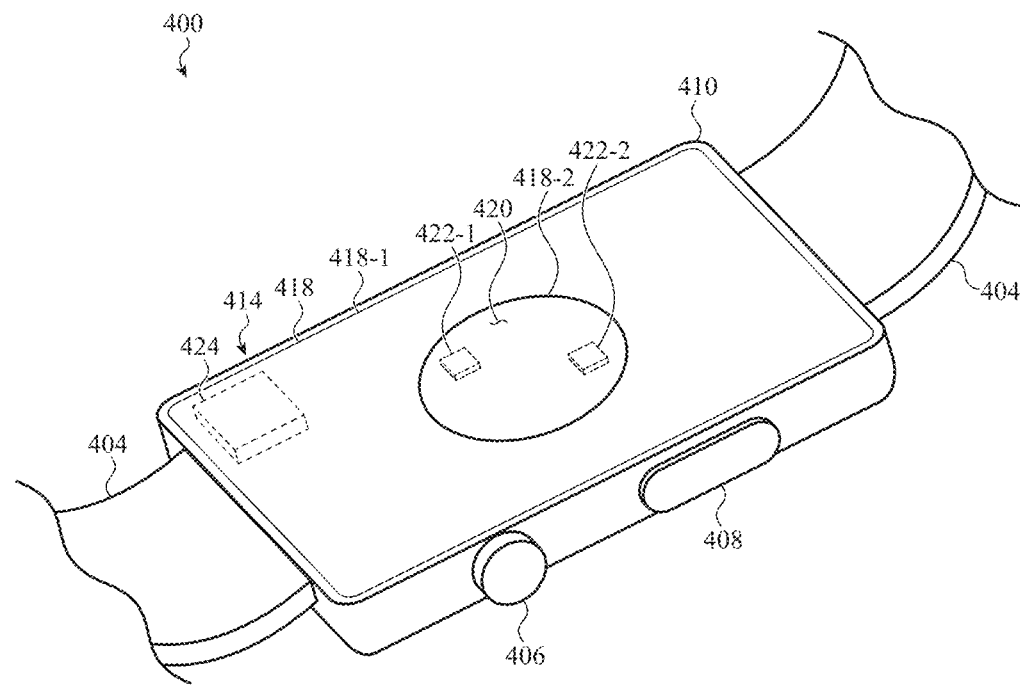

FIGS. 7A and 7B show an example of a wearable device 400 that may incorporate one or more sensors, including one or more multi-channel SMI sensors as discussed herein. Specifically, FIG. 7A shows a front isometric view of the wearable device 400, while FIG. 7B shows a back isometric view of the wearable device 400. The sensors of the wearable device 400 may be used, for example, to acquire biometric data from a user (e.g., heart rate, respiration rate, blood pressure, blood flow rate, blood oxygenation), determine touch or gesture input from a user, or to determine a status of the wearable device 400 (e.g., whether the wearable device is being worn, one or more ambient environmental conditions). While the wearable device 400 is shown having the form factor of a watch, the wearable device 400 could by any suitable type of wearable device having any form factor. Further, the principles of the present disclosure apply equally to non-wearable devices such as smartphones, tablets, laptop computers, desktop computers, and the like.

The wearable device 400 includes a body 402 (e.g., a watch body) and a band 404. The body 402 may include an input or selection device, such as a crown 406 or a button 408. The band 404 may be attached to a housing 410 of the body 402, and may be used to attach the body 402 to a body part of a user (e.g., an arm, wrist, leg, ankle, or waist). The housing 410 may at least partially surround a display 412. In some embodiments, the housing 410 may include a sidewall 414, which may support a front cover 416 (shown in FIG. 7A) and/or a back cover 418 (shown in FIG. 7B). The front cover 416 may be positioned over the display 412, and may provide a window through which the display 412 is viewed. In some embodiments, the display 412 may be attached to (or about) the sidewall 414 and/or the front cover 416. In other embodiments, the display 412 may not be included and/or the housing 410 may have an alternative configuration.

The display 412 may include one or more light emitting elements including, for example, light-emitting elements that define a light-emitting diode (LED) display, an organic LED (OLED) display, a liquid crystal display (LCD), an electroluminescent (EL) display, or any other type of display. In some embodiments, the display 412 may include, or be associated with, one or more touch and/or force sensors that are configured to detect touch and/or force applied to the front cover 416.

In some embodiments, the sidewall 414 of the housing 410 may be formed using one or more metals (e.g., aluminum or stainless steel), polymers (e.g., plastics), ceramics, or composites (e.g., carbon fiber). The front cover 416 may be formed, for example, using one or more of glass, a crystal (e.g., sapphire), or a transparent polymer (e.g., plastic) that enables a user to view the display 412 through the front cover 416. In some cases, a portion of the front cover 416 (e.g., a perimeter portion of the front cover 416) may be coated in an opaque ink to obscure components included within the housing 410. In some cases, all of the exterior components may be formed of a transparent material, and the components of the wearable device 400 may or may not be obscured by an opaque ink or opaque structure within the housing 410.

The back cover 418 may be formed using the same material or materials used to form the sidewall 414 and/or the front cover 416. In some cases, the back cover 418 may be part of a monolithic element that also forms the sidewall 414. In other cases, and as shown, the back cover 418 may be a multi-part back cover, such as a back cover having a first back cover portion 418-1 attached to the sidewall 414 and a second back cover portion 418-2 attached to the first back cover portion 418-1. The second back cover portion 418-2 may in some embodiments have a circular perimeter and an arcuate exterior surface 420 (i.e., an exterior surface 420 having an arcuate profile).

The front cover 416, the back cover 418, and the first back cover portion 418-1 may be mounted to the sidewall 414 using fasteners, adhesives, seals, gaskets, or other components. The second back cover portion 418-2, when present, may be mounted to the first back cover portion 418-1 using fasteners, adhesives, seals, gaskets, or other components.

A display stack or device stack (hereinafter referred to as a "stack") including the display 412 may be attached (or abutted) to an interior surface of the front cover 416 and extend into an interior volume of the wearable device 400. In some cases, the stack may include a touch sensor (e.g., a grid of capacitive, resistive, strain based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 416 (e.g., to a display surface of the wearable device 400).

The wearable device 400 may include various sensors 422. For purposes of illustration, the wearable device 400 is shown having a first sensor 422-1 and a second sensor 422-2. The first sensor 422-1 may be a multi-channel SMI sensor as discussed herein. The second sensor 422-2 may be a different type of sensor such as a temperature sensor, which may be used to sense the same or different data as the first sensor 422-1. The wearable device 400 may include circuitry 424 (e.g., processing circuitry and/or other components) configured to determine or extract, at least partly in response to signals received directly or indirectly from sensors therein (e.g., the first sensor 422-1 and the second sensor 422-2), data about the user (e.g., biometric data), touch or gesture input from a user, a status of the wearable device 400, and/or data about the environment surrounding the wearable device 400. In doing so, the circuitry 424 may process signals from sensors therein using any suitable transformations, approximations, mathematical operations, and/or machine learning models. In some embodiments, the circuitry 424 may be configured to convey the determined or extracted parameters or statuses to a user of the wearable device 400. For example, the circuitry 424 may cause the indication or indications to be displayed on the display 412, indicated via audio or haptic outputs, transmitted via a wireless communications interface or other communications interface, and so on. The circuitry 424 may also or alternatively maintain or alter one or more settings, functions, or embodiments of the wearable device 400, including, in some cases, what is displayed on the display 412.

Figure 8:
FIG. 8 depicts a simplified block diagram of an electronic device that may incorporate a multi-channel SMI sensor, such as described herein.
Figure 8:
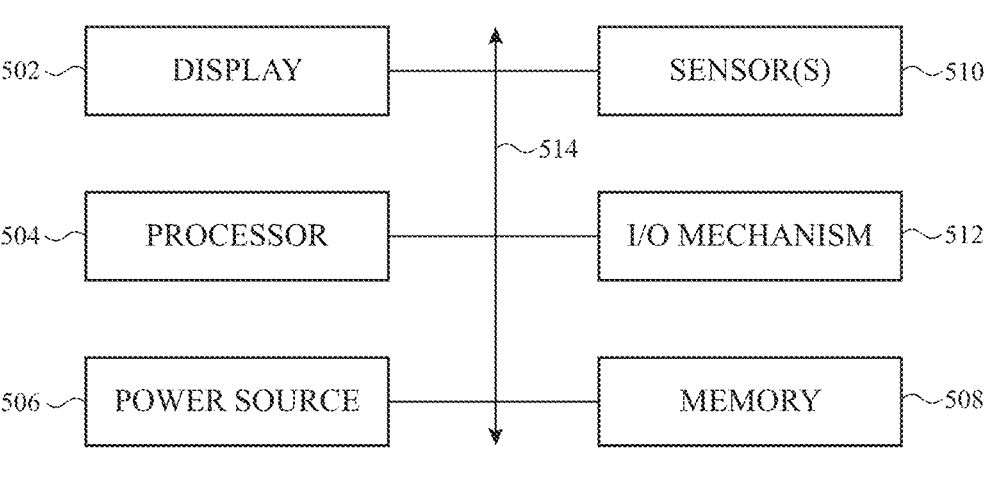

To illustrate a more general functional device that may include one or more electromagnetic radiation sensors as discussed herein, FIG. 8 shows a sample electrical block diagram of a device 500. The device 500 may include a display 502 (e.g., a light-emitting display), a processor 504, (also referred to herein as processing circuitry), a power source 506, a memory 508, or storage device, a sensor system 510, and an input/output (I/O) mechanism 512 (e.g., an I/O device, an I/O port, or a haptic I/O interface). The processor 504 may communicate, either directly or indirectly, with some or all of the other components of the device 500. For example, a system bus or other communication mechanism 514 can provide communication between the display 502, the processor 504, the power source 506, the memory 508, the sensor system 510, and the I/O mechanism 512.

The processor 504 may be implemented as any electronic device capable of processing, receiving, or transmitting data or instructions, whether such data or instructions is in the form of software or firmware or otherwise encoded. For example, the processor 504 may include a microprocessor, a central processing unit (CPU), an application-specific integrated circuit (ASIC), a digital signal processor (DSP), a controller, or a combination of such devices. As described herein, the term "processor" or "processing circuitry" is meant to encompass a single processing unit, multiple processors, multiple processing units, or other suitably configured computing element or elements.

It should be noted that the components of the device 500 can be controlled by multiple processors. For example, select components of the device 500 (e.g., the sensor system 510) may be controlled by a first processor and other components of the wearable device (e.g., the display 502) may be controlled by a second processor, where the first and second processors may or may not be in communication with each other.

The power source 506 can be implemented with any device capable of providing energy to the device 500. For example, the power source 506 may include one or more batteries or rechargeable batteries. Additionally or alternatively, the power source 506 may include a power connector or power cord that connects the device 500 to another power source, such as a wall outlet.

The memory 508 may store electronic data that can be used by the device 500. For example, the memory 508 may store electrical data or content such as, for example, audio and video files, documents and applications, device settings and user preferences, timing signals, control signals, and data structures and databases. The memory 508 may include any type of memory. By way of example only, the memory 508 may include random access memory (RAM), read-only memory (ROM), flash memory, removeable memory, other types of storage elements, or combinations of such memory types.

The device 500 may also include one or more sensor systems 510 positioned almost anywhere thereon. For example, the sensor system may include one or more SMI sensors as discussed herein. The sensor system 510 may be configured to sense one or more types of parameters, such as but not limited to: vibration, light, touch, force, heat, movement, relative motion, biometric data (e.g., biological parameters) of a user, air quality, proximity, position, or connectedness. By way of example, the sensor system 510 may include one or more multi-channel SMI sensors, a heat sensor, a position sensor, a light or optical sensor, an accelerometer, a pressure transducer, a gyroscope, a magnetometer, a health monitoring sensor, and/or an air quality sensor. Additionally, the one or more sensor system 510 may utilize any suitable sensing technology including, but not limited to, interferometric, magnetic, capacitive, ultrasonic, resistive, optical, acoustic, piezoelectric, or thermal technologies.

The I/O mechanism 512 may transmit or receive data from a user or another electronic device. The I/O mechanism 512 may include the display 502, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 512 may transmit electronic signals via a communications interface, such as a wireless, wired, and/or optical communications interface. Examples of wireless and wired communications interfaces include, but are not limited to, cellular and Wi-Fi communications interfaces.

These foregoing embodiments depicted in FIGS. 1-8 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more other embodiments, whether or not such embodiments are described and whether or not such features are presented as being a part of a described embodiment. Thus, the breadth and scope of the present description should not be limited by any of the above-described exemplary embodiments but is instead defined by the claims herein presented.

What is claimed is:

1. A multi-channel self-mixing interferometric (SMI) sensor, comprising:
a first SMI sensor configured to:
emit a first light having a first polarization; and
generate a first SMI signal based on self-mixing of a reflected portion of the first light;
a second SMI sensor configured to:
emit a second light having a second polarization that is different than the first polarization; and
generate a second SMI signal based on self-mixing of a reflected portion of the second light; and
a polarization-selective lens configured to:
direct the first light in a first direction towards a first location;
direct the reflected portion of the first light, received from the first location, back towards the first SMI sensor;
direct the second light in a second direction towards a second location, the second direction being different from the first direction and the second location being different than the first location; and
direct the reflected portion of the second light, received from the second location, back towards the second SMI sensor.

2. The multi-channel SMI sensor of claim 1, wherein:
the first polarization is a transverse electric polarization; and
the second polarization is a transverse magnetic polarization.

3. The multi-channel SMI sensor of claim 1, wherein:
the first polarization is a left-handed polarization; and
the second polarization is a right-handed polarization.

4. The multi-channel SMI sensor of claim 1, wherein:
the first location and the second location are separated by at least 0.5 mm.

5. The multi-channel SMI sensor of claim 1, wherein:
the first SMI sensor and the second SMI sensor are monolithically integrated on a semiconductor die.

6. The multi-channel SMI sensor of claim 1, wherein:
the polarization-selective lens is a metalens.

7. The multi-channel SMI sensor of claim 1, wherein:
the first light and the second light are at least partially overlapping on the polarization-selective lens.

8. The multi-channel SMI sensor of claim 1, wherein:
the first light and the second light are emitted simultaneously.

9. A multi-channel self-mixing interferometric (SMI) sensor, comprising:
an SMI sensor configured to:
emit a light having a mixed polarization; and
generate an SMI signal based on self-mixing of a reflected portion of the light; and
a polarization-selective lens configured to:
direct the light from the SMI sensor having a first polarization in a first direction towards a first location;
direct the reflected portion of the light having the first polarization, received from the first location, back towards the SMI sensor;
direct the light from the SMI sensor having a second polarization in a second direction towards a second location, the second polarization being different than the first polarization, the second direction being different from the first direction, and the second location being different than the first location; and
direct the reflected portion of the light having the second polarization, received from the second location, back towards the SMI sensor.

10. The multi-channel SMI sensor of claim 9, wherein the polarization-selective lens is further configured to:
direct a portion of light having the second polarization from the first location back towards the SMI sensor; and
direct a portion of light having the first polarization from the second location back towards the SMI sensor.

11. The multi-channel SMI sensor of claim 10, wherein:
the first location and the second location are on a surface of an object;
the portion of light having the second polarization at the first location enters the surface at the second location and exits the surface at the first location; and
the portion of light having the first polarization at the second location enters the surface at the first location and exits the surface at the second location.

12. The multi-channel SMI sensor of claim 9, wherein:
the first polarization is a transverse electric polarization; and
the second polarization is a transverse magnetic polarization.

13. The multi-channel SMI sensor of claim 9, wherein:
the first polarization is a left-handed polarization; and
the second polarization is a right-handed polarization.

14. The multi-channel SMI sensor of claim 9, wherein:
the first location and the second location are separated by at least 0.5 mm.

15. The multi-channel SMI sensor of claim 9, wherein:
the polarization-selective lens is a metalens.

16. A multi-channel self-mixing interferometric (SMI) sensor, comprising:
an SMI sensor configured to:
emit a first light having a first polarization in response to a first control signal;
emit a second light having a second polarization in response to a second control signal, the second polarization being different than the first polarization and the second control signal being different than the first control signal;
generate a first SMI signal based on self-mixing of a reflected portion of the first light; and
generate a second SMI signal based on self-mixing of a reflected portion of the second light; and a polarization-selective lens configured to:

direct the first light in a first direction towards a first location;

direct the reflected portion of the first light, received from the first location, back towards the SMI sensor;

direct the second light in a second direction towards a second location; and direct the reflected portion of the second light, received from the second location, back towards the SMI sensor.

17. The multi-channel SMI sensor of claim 16, wherein:

the polarization-selective lens is a metalens.

18. The multi-channel SMI sensor of claim 16, wherein:

the first polarization is a transverse electric polarization; and the second polarization is a transverse magnetic polarization.

19. The multi-channel SMI sensor of claim 16, wherein:

the first polarization is a left-handed polarization; and the second polarization is a right-handed polarization.

20. The multi-channel SMI sensor of claim 16, wherein:

the first control signal has a different current than the second control signal.

\* \* \* \* \*